Figure 1:
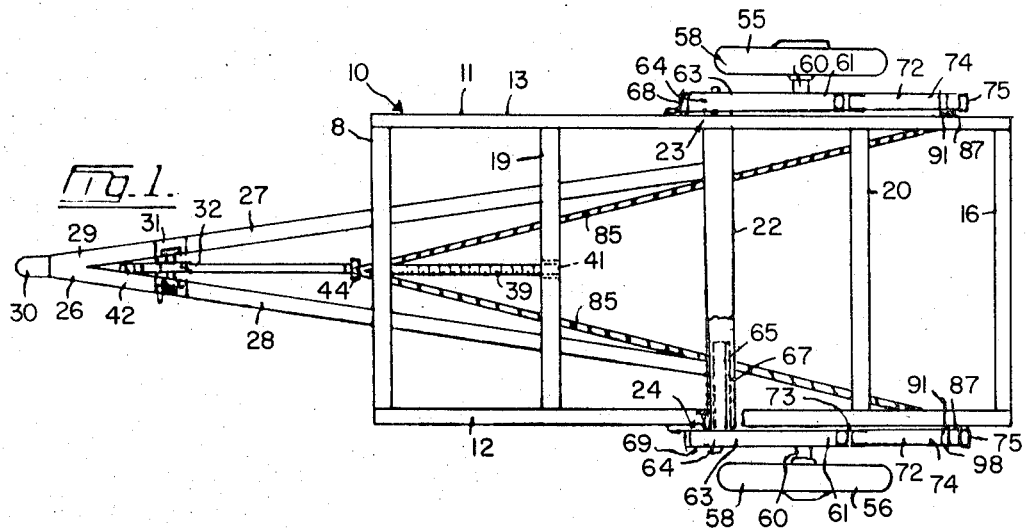

United States Patent [19]
Armstrong

[11] 3,811,697
[45] May 21, 1974

[54] VERTICAL LIFT TRAILER

[75] Inventor: Alvin P. Armstrong, Vancouver, British Columbia, Canada

[73] Assignee: Kolof Holding Limited, West Vancouver, British Columbia, Canada

[22] Filed: Jan. 11, 1971

[21] Appl. No.: 105,435

Related U.S. Application Data

[63] Substitute for Ser. No. 730,780, May 21, 1968.

[52] U.S. Cl............................ 280/43.18, 280/43.19
[51] Int. Cl........................................... B62d 21/18
[58] Field of Search.......... 280/43.18, 43.19, 43.17, 280/414 R

[56] References Cited
UNITED STATES PATENTS

| | | | |
|---|---|---|---|
| 2,807,381 | 9/1957 | Tegeler | 280/43.19 |
| 2,621,942 | 12/1952 | Getz | 280/414 R |
| 2,736,568 | 2/1956 | Martin | 280/414 R |

Primary Examiner—Benjamin Hersh
Assistant Examiner—Robert R. Song
Attorney, Agent, or Firm—Thomas W. Secrest

[57] ABSTRACT

A trailer having a pair of ground engaging wheels mounted on the after ends of a pair of elongated supporting members the latter being swingably connected for rotation about a transverse axis to the trailer frame. Leaf springs, to which operating cables are connected, extend rearwardly from the supporting arms for swingably positioning the latter relative to the trailer frame when operated by cables.

6 Claims, 5 Drawing Figures

PATENTED MAY 21 1974

3,811,697

VERTICAL LIFT TRAILER

U.S. Pat. application Ser. No. 730,780 of this inventor, filing date of May 21, 1968 for an invention entitled "VERTICAL LIFT TRAILER" is the parent application of this application Ser. No. 105,435, and this application is a substitute application for said U.S. Pat. application Ser. No. 730,780.

This invention relates to vehicles commonly called trailers used in the transportation of relatively light loads such as boats and the like, and in particular to trailers wherein the frame may be lowered or raised towards or away from the ground surface whereby the loads may be easily unloaded or loaded with the frame in a lowered position and thereafter transported with the frame in an elevated position. As this type of trailer is normally pulled by a passenger car it must be of relatively light yet strong construction and must be capable of being towed in absolute safety at relatively high speeds. Furthermore, as sportsmen and the like very often wish to take such a vehicle as a boat into fairly remote areas where no help can be expected, these trailers must be capable of operation by one man alone.

It is an object of the present invention to provide a new and improved trailer-type vehicle having a frame which may be lowered toward or raised from the ground surface to facilitate loading and unloading the vehicle.

It is another object of this invention to provide a trailer-type vehicle which is light yet of strong construction, which may be operated between its various positions by one man alone, which is inexpensive of construction and yet which may be towed at high speeds over the highway.

In attaining these ends the present invention provides a trailer having a fore and aft elongated carrying frame, a pair of ground engaging wheels on opposite sides of the frame, each of said wheels having an axle, a supporting arm connected at one end to each axle respectively, and extending forwardly therefrom, means swingably connecting the other ends of the supporting arms to the frame for swinging movement about a transverse axis thereby to shift the wheels between lowered and elevated positions relative to the frame, an elongated leaf spring rigidly connected at one end to each of said supporting arms and extending rearwardly therefrom, guide bearing means connected to the frame beneath the leaf springs, cables connected to the other ends of the leaf springs and trained around the guide bearing means and operating means on the frame connected to said cables for selectively swinging the wheels from their elevated positions to their lowered positions and permitting their return to their elevated positions.

Figure 2:
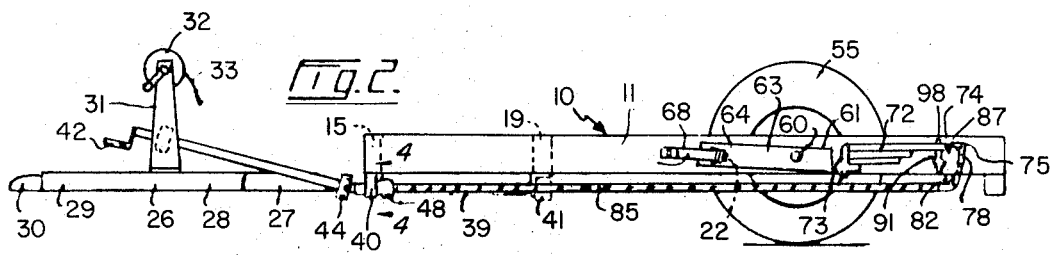
Figure 3:
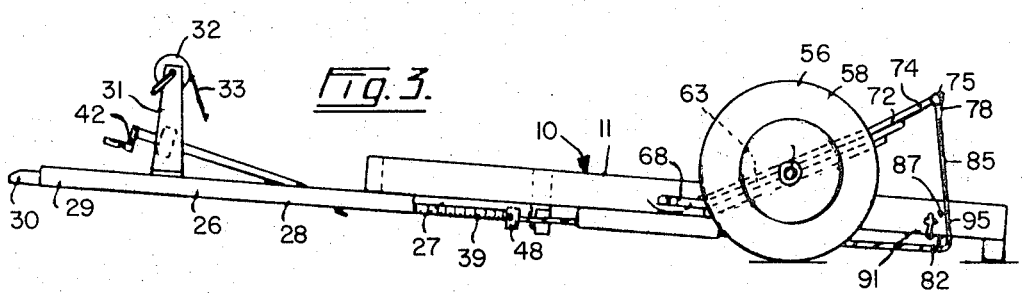
Figure 5:
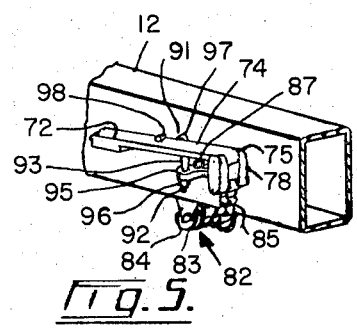
Figure 4:
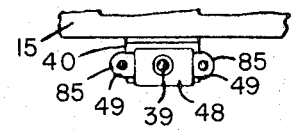

FIG. 1 is a plan view of the invention constructed in a form suitable for transporting small boats, FIG. 2 is a side view of the invention with portions thereof broken away for clarity and with the wheels shown in their most lowered position relative to the frame, FIG. 3 is a view similar to FIG. 2 showing the wheels in an elevated position relative to the frame, FIG. 4 is a sectional view of a portion of the invention taken on the line 4—4 of FIG. 2, and FIG. 5 is an isometric view of a portion of the invention.

Referring to the drawings, the vehicle of the invention therein shown is a boat trailer 10. The trailer comprises a rectangular carrying structure or frame 11 made of tubular structural members of preferably rectangular cross section. This frame includes two longitudinally extending side members 12 and 13 forward and aft transverse end members 15 and 16 and a pair of fore and aft transversely extending intermediate members 19 and 20. The members comprising the frame are preferably welded together so as to obtain utmost rigidity.

Welded, or otherwise suitably connected to the frame 10 for rigidity, is a transversely extending cylindrical, tubular housing 22. This housing is located substantially intermediately between the intermediate members 19 and 20 and is connected to the side members 12 and 13. The ends 23 and 24 of this housing are open and extend a short distance outwardly beyond said side members 12 and 13.

The frame 11 also includes a centrally located longitudinally extending tongue 26 formed of two elongated structural members 27 and 28 arranged in the form of a forwardly pointing V and located beneath end and intermediate members 15 and 19. The after ends of the structural members 27 and 28 are secured as by welding to the housing 22 and are also in a like manner, secured to said members 15 and 19. The structural members 27 and 28 are also joined, as by welding, at their forward ends 29. The tongue so formed is provided with a conventional trailer-hitch socket 30. Aft of the socket 30 is a conventional bowpost 31 which carries at its upper end a small handwinch 32 for operating a conventional boat loading cable 33.

A threaded shaft or screw 39 is mounted in longitudinally aligned thrust bearings 40 and 41 secured to said members 15 and 19, respectively. These bearings permit free rotation of the latter but prevent longitudinal movement thereof. Rotation of the screw is effected by means of a crank 42, the crank shaft of which is rotatably mounted in a suitable supporting bracket, not shown, connected to the bowpost 31 and has a universal connection as at 44 with the front end of the screw 39. A nut 48 is fitted on the screw 39, said nut being provided with eye elements 49 on either side thereof.

The trailer 10 also includes a pair of left and right wheel assemblies 55 and 56. As both assemblies are identical but in counterposed relationship the same numerology will be used to describe the various components of each. These wheel assemblies include wheels 58, preferably of the rubber tire variety which are rotatably mounted, in the conventional manner, on stub axles 60. Each of these stub axles is non-rotatably secured as by welding to ends 61 of elongated supporting arms 63. These supporting arms may be tubular or solid, however, their cross sectional area must be such as to withstand appreciable torsion stresses. At the other ends 64 of the supporting arms are nonrotatably connected as by welding, right angularly extending elongated stub shafts 65.

These shafts 65 rotatably extend into elongated bearings 67 which are press fitted into the housing 22 through the open ends 23 and 24 thereof. These bearings may be formed of a suitable plastic material which is sufficiently strong to prevent lateral movement of the stub shafts therein. The wheel assemblies 55 and 56 are so arranged that the supporting arms 63 extend rearwardly from the housing and are maintained in position in the latter by means of restraining brackets 68 which are bolted to the side members 12 and 13 so as to be easily removable therefrom said brackets having restraining arms 69 which extend over the outer ends of said stub shafts 65.

To each of the supporting arms 63 at the after ends 61 thereof are connected conventional leaf springs 72. These leaf springs are the usual type constituting a number of flat superimposed plates disposed in step fashion relative to each other. The springs are connected by means of conventional shackles 73 to their respective supporting arms so that they extend rigidly rearwardly therefrom. The main leaf 74 of each of the leaf springs is provided with a conventional eye 75 at its after end in which a conventional spring shackle 78 is swingably secured.

Guide bearing means 82 in the form of small sheaves 83 mounted between brackets 84 are fastened to the members 12 and 13 directly below the shackles 78 of the leaf springs. These sheaves act as rolling guides for a pair of cables 85 which are extended between the nut 48 and shackle 78. The eye elements 49 of the nut provide suitable means for connection of the cables 85 thereto and the latter may be connected to the shackles in any known, suitable manner.

Extending laterally from the side members 12 and 13 immediately above the sheaves 83 are a pair of laterally extending stops 87. These stops may be in the form of stub shafts welded or otherwise rigidly secured to said members 12 and 13.

Mounted on the side members 12 and 13 adjacent each stop 87 is a locking member 91 (see FIG. 5), which takes the form of a hook having a vertically elongated shank 93 threaded at its lower end 92, which slidably and rotatably extends through a suitable aperture formed in a bracket 95. These brackets are connected as by welding to the side members 12 or 13. A nut 96 is threaded over the threaded end of the shank 93 of each locking members 91 below the bracket 95. Each shank is right angularly bent at its upper end 97 to form a restraining arm 98.

The operation of trailer 10, that is the lowering and elevating of the frame 11 may best be described with reference to FIGS. 2 and 3.

With the nut 48 located near the forward end of the screw 39 as illustrated in FIG. 2, the wheels are positioned in their lowered position relative to the frame so as to elevate the latter above the ground surface. In this position the leaf springs 72 are both drawn tightly against their respective stops 87. In order to lower the after end of the frame to the ground surface, the screw is rotated by means of the crank 42 in a direction which will result in the movement of the nut 48 rearwardly thereby permitting the cables 85 to run over the sheaves 83. The weight of the frame, whether loaded or unloaded, is sufficient to permit the wheel assemblies 55 and 56 to swing upwardly to an elevated position relative to the frame as illustrated in FIG. 3. When the frame has been lowered sufficiently to permit its being loaded, the screw 39 is then rotated in the opposite direction to draw the nut 48 forwardly thereby again drawing the leaf springs 72 against the stops 87. When this position is reached these springs may be locked in position by swinging the restraining arms 98 thereover and tightening the nuts 96 against the underside of the brackets 95. The screw 39 then may be rotated to back off the nut 48 so as to relieve the cables 85 of the tension stresses imposed thereon.

The advantages of trailer 10 over those of trailers of prior design is apparent. The operation of the frame between its elevated and lowered position and the loading and the unloading from the trailer of a boat, by one man, is relatively easy. The trailer when hitched to an automobile or the like may be backed into the water and then the frame lowered to permit the boat to float freely. The trailer may then be hauled from beneath the boat. Loading of a boat on the trailer is also very simple as the trailer may be backed into the water, the frame lowered and the boat floated up to the bowpost and connected to cable 33 then the frame may be elevated to support the boat and the trailer then hauled from the water.

As in all vehicles which are lightly constructed yet which are called upon to transport heavy loads the component parts of such trailers such as the wheel assemblies thereof get slightly out of alignment. This will not greatly affect the high speed transportability of trailer 10 as the supporting arms, being swingably connected at their forward ends to the frame provide a castered wheel assembly which will automatically assume a tracking position when the trailer is moved forwardly. This is important in the event that the leaf springs, through forgetfulness of the operator, are not secured to their respective stops by means of the locking members 91. In view of the length of the supporting arms, a small amount of lateral swinging motion can always be expected. This is of no consequence where the wheels will automatically track as in vehicle 10. It would, however, be very hazardous if the positions of the leaf springs and supporting arms were reversed.

The construction of trailer 10 permits its easy assembly and disassembly for storage where storage space is limited. It is only necessary to unbolt the restraining brackets 68 to permit the stub shafts 65 to be withdrawn from the bearings 67. The wheel assemblies and frame may then be stored separately.

The trailer, in accordance with the above description is particularly adapted for boats, however, it is to be understood that it may well be used for transporting other types of loads. The frame 11 may therefore be provided with rollers or the like, not shown, to facilitate loading and unloading operations.

I claim:

1. A trailer comprising a fore and aft extending carrying frame, a pair of ground engaging wheels on opposite sides of the frame, each of said wheels having an axle, and elongated supporting arm connected at one end of each axle respectively, and extending forwardly therefrom, means swingably connecting the other ends of the supporting arms to the frame for swinging movement about transverse axes, thereby to shift the wheels between lowered and elevated positions relative to the frame, an elongated leaf spring rigidly connected at one end to each of said supporting arms and extending rearwardly therefrom, guide bearing means connected to the frame beneath the leaf springs, cables connected to the upper ends of the leaf springs and trained around the guide bearing means and operating means on the frame connected to said cables for selectively swinging the wheels from their elevated positions to their lowered positions and permitting their return to their elevated positions, said operating means comprising an elongated rotatable screw mounted in a fore and aft extending position on the frame, a travelling nut on the screw to which the cables are attached and a crank for rotating the screw so as to move the nut longitudinally of the frame and thereby operate the cables against the leaf springs.

2. A trailer comprising a fore and aft extending carrying frame, a transversely extending open-ended tubular housing connected to the frame forwardly of the after end of the latter, a pair of ground engaging wheels on opposite sides of the frame, each of said wheels having an axle, an elongated supporting arm connected at one end to each axle, respectively, and extending forwardly therefrom, stub shafts extending from the other ends of the supporting arms for rotatably and slidably fitting in the open ends of the tubular housing, thereby permitting the wheels to shift between lowered and elevated positions relative to the frame, restraining brackets removably connected to the frame and engaging the stub shafts to prevent their withdrawal from the housing, an elongated leaf spring rigidly connected at one end to each of said supporting arms and extending rearwardly therefrom, guide bearing means connected to the frame beneath the leaf springs, cables connected to the other ends of the leaf spring and trained around the guide bearing means and operating means on the frame connected to said cables for selectively swinging the wheels from their elevated to their lowered positions and permitting their return to their elevated positions, said means comprising an elongated rotatable screw mounted in a fore and aft extending position on the frame, a travelling nut on the screw to which the cables are attached and a crank for rotating the screw so as to move the nut longitudinally of the frame and thereby operate the cables against the leaf springs.

3. A trailer as claimed in claim 1, in which said elongated leaf springs are attached to their respective supporting arms rearwardly of the connection between the supporting arms and said axles.

4. A trailer as claimed in claim 2, in which said elongated leaf springs are attached to their respective supporting arms rearwardly of the connection between the supporting arms and said axles.

5. A trailer comprising a fore and aft extending carrying frame, a pair of ground engaging wheels on opposite sides of the frame, each of said wheels having an axle, an elongated supporting arm connected at one end to each axle, respectively, and extending therefrom, means swingably connecting the forward ends of the supporting arms to the frame for swinging movement about transverse axes thereby to shift the wheels between lowered and elevated positions relative to the frame, an elongated leaf spring rigidly connected at one end to each of said supporting arms and extending rearwardly therefrom guide bearing means connected to the frame beneath the leaf springs, cables connected to the other ends of the leaf springs and trained around the guide bearing means and operating means on the frame connected to said cables for selectively swinging the wheels from their elevated positions to their lowered positions and permitting their return to their elevated positions, said operating means comprising an elongated rotatable screw mounted in a fore and aft extending position on the frame, a travelling nut on the screw to which the cables are attached and means for rotating the screw to move the nut longitudinally of the frame and thereby operate the cables against the leaf springs.

6. A trailer as claimed in claim 5, in which said elongated leaf springs are attached to their respective supporting arms rearwardly of the connection between the supporting arms and said axles.

* * * * *